Nov. 19, 1963   J. M. STRANG ETAL   3,111,570
GLASS SANDWICHES PRIMARILY FOR WINDOWS OF OPTICAL INSTRUMENTS
Filed Dec. 18, 1958
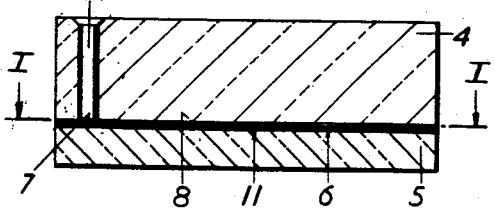
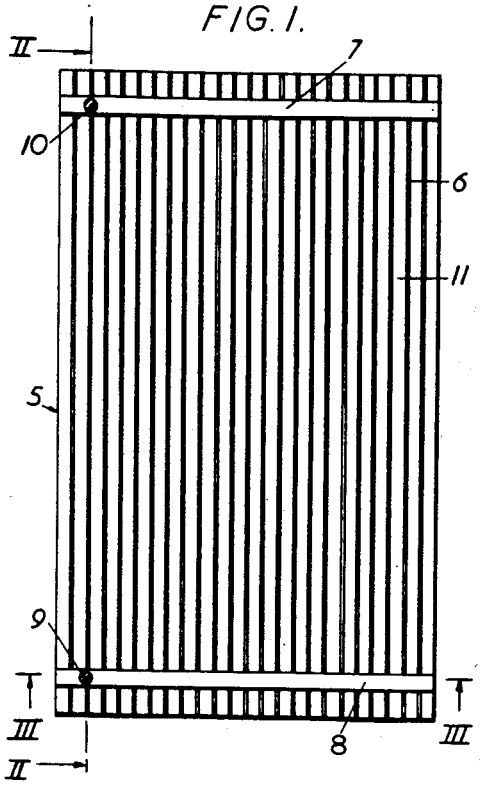
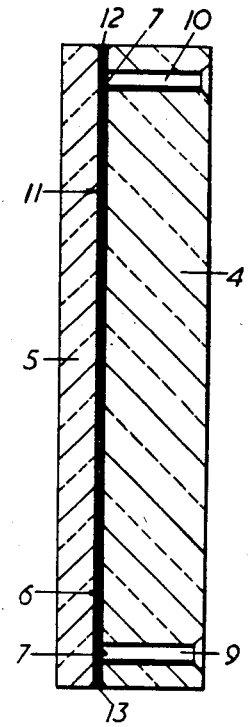
Inventors
JOHN MARTIN STRANG,
JOHN RUPERT DAVY and
ALEXANDER JAMES NAPIER HOPE
By
Mason, Fenwick & Lawrence
Attorneys

United States Patent Office 3,111,570
Patented Nov. 19, 1963

3,111,570
GLASS SANDWICHES PRIMARILY FOR WINDOWS OF OPTICAL INSTRUMENTS
John Martin Strang, John Rupert Davy, and Alexander James Napier Hope, all of Caxton St., Anniesland, Glasgow W. 3, Scotland
Filed Dec. 18, 1958, Ser. No. 781,412
Claims priority, application Great Britain Dec. 27, 1957
4 Claims. (Cl. 219—19)

This invention relates to a glass sandwich primarily for windows for optical instruments involving optical magnification, and of the type in which the sandwich is heated.

It has been proposed to provide glass sandwiches comprising glass sheets separated by a transparent cement in which are embedded fine high resistance electrical heating wires. The main object of such sandwiches is to provide a light-transmitting window which when subjected to heating mitigates the effect of misting or frosting. In such sandwiches the glass temperature may be raised to an appropriate value without very much loss in light transmission, although if overheated the cement may tend to develop bubbles thus spoiling the light transmission. Moreover, for certain purposes, as for example for aircraft, owing to the very low external temperatures which arise the electrical loading per unit surface area must be high, and must be maintained for long periods, and if the heating is, by mistake, left on when the aircraft lands, the cement and therefore the sandwich as a whole may be permanently damaged. Furthermore, we have found that for purposes of optical apparatus or instruments which involve optical magnification, for example four or more, this type of sandwich is unsuitable, as when heated deterioration of optical definition occurs causing fuzziness or blurring of the image, and with magnification involved this becomes quite unacceptable where any degree of precision is required. Experiments show that this fuzziness arises through change of the refractive index of the cement when an appreciable increase in temperature takes place.

An object of the invention is to provide a glass sandwich which will be able to withstand relatively high heat loadings, and a further object is to provide such a sandwich in which serious deterioration of the optical definition, on heating, is avoided.

According to the present invention we provide a glass sandwich primarily for optical instruments involving optical magnification; incorporating heating means for the glass, and comprising between the glass layers a cement of transparent thermosetting synthetic resin.

Preferably the heating means comprises thin wire elements adapted to be electrically energised, such wires being closely associated with the glass for heat transfer purposes.

Advantageously the cement is an epoxy synthetic resin, for example "Epikote 815" an epoxy resin also known as "Epon."

Preferably the cement is one which has a refractive index whose change over the temperature range from 20° C. to 400° C. is small. Furthermore the cement may permit clear definition of an image magnified eighteen times when the heat applied does not exceed one hundred watts per square foot of sandwich surface.

We will now describe an embodiment of the invention merely by way of example with reference to the accompanying drawings, in which:

FIG. 1 is a sectional plan view on the line I—I of FIG. 3,

FIG. 2 is a sectional elevation on the line II—II of FIG. 1, and

FIG. 3 is a sectional elevation on the line III—III of FIG. 1.

The drawings show a glass sandwich according to the invention comprising upper and lower glass layers 4, 5 and between these electric heating elements 6 which are electrically connected in parallel through bus bars 7, 8, these bus bars each being connected respectively to a stud terminal 9, 10 through which the electricity supply is led. The elements 6 are retained in position and the glass layers 4 and 5 are also secured in position, by a cement 11.

One example of a method of assembling the sandwich is to preheat the glass layers 4 and 5 to say 40° C., the heating elements 6 are then laid on layer 4, being applied sinuously thereto by winding between opposed sets of hooks urged away from each other. The bus bars 7 and 8 are applied on top of the elements, and the studs 9 and 10 are put into place. The wires forming the heating elements are laid with their ends which interconnect the lengths projecting over the edge of the layer 4. The cement is then applied at the elements and around the studs 9 and 10, the layer 5 is put into place, and the whole is subjected to heat and pressure for a period of, for example, twelve hours. The temperature may be of the order of 75° C. and the pressure of the order of 1 lb. per square inch. After assembly the projecting ends of the wires 6 are cut off and a re-entrant groove is formed at 12, 13 (FIG. 2) along the end of the sandwich and cement is applied to fill this groove.

In the particular example the cement utilised is an epoxy synthetic resin in liquid form known in the trade as "Epikote 815" an epoxy resin and a hardener is added, for example that known in the trade as "No. 951" or a similar polyamide. On heating, the epoxy is polymerized and sets finally maintaining the parts together and in the appropriate spaced relationship.

It is explained that in practical use the temperature of the wire heating elements of the sandwich may vary between say 20° C. and 400° C. when heating is applied, and as applied to an aircraft window or lens for example the average temperature of the whole may vary upwards from say 20° C. to 100° C., at a time when the temperature of the surroundings may be as low as for example, minus 40° C. Apart from this, of course, the sandwich will withstand the lower temperatures of the surroundings when heating is not being utilised.

It has been found that with a cement of the nature indicated, a relatively high heating loading may be applied which enables the sandwich to maintain optical efficiency under conditions of high temperature, while the heating up can be effected in a much shorter time when it becomes necessary to clear the optical surface of fog or frost. The heating of the sandwich moreover may be effected without the serious deterioration of definition hitherto experienced, and the temperature may be maintained for long periods without this adverse effect.

With the sandwich referred to above it has been found that the average temperature of the glass may be raised to at least 100° C. without deterioration of the sandwich, either as regards its mechanical properties or its optical definition. Moreover it is found that the change of refractive index over the working temperature range of the wires for example up to 175° C. or even up to 400° C. is small even where a magnification of the order of four, ten or forty is involved. As aforesaid with sandwiches hitherto proposed deterioration of definition is a real disadvantage with degrees of magnification of four times or over, while in some optical instruments magnification of the order of forty times may be involved. The present invention gives markedly better results involving a negligible loss in definition.

Further examples of suitable cement materials are as follows:

"Araldite"
BX. 2210 an epoxy resin

R. 18774 or R. 19019 an epoxy resin
"Epi Rez" an epoxy resin

The epoxy resins are of various types. In general, they are formed by the interaction of epoxides (such as epichlorohydrin or diglycidyl ether) with polyhydroxy compounds (such as bisphenols, novolac resins, or glycerol). They are commonly applied in the liquid or thermoplastic state, and are thereafter cured or thermoset by heating with curing or cross-linking agents (such as polyamines or their salts, or polybasic acids or their anhydrides).

Various hardening or curing agents may if desired be employed, for example simple amines (such as triethylamine, benzyldimethylamine, or m-phenylenediamine) or amine salts (such as the acetate or 2-ethylhexoate of mono- or tri(dimethylamino) phenol), or complex polyamides (such as the condensate of dimerised or trimerised vegetable oils with aliphatic or aromatic polyamides, e.g. "Versamid").

The synthetic resin should, of course, be transparent over the range of wavelengths of light to be transmitted and should not appreciably reduce the light transmitted therethrough.

In a modification, from a different category of polymers use may be made of derivatives of polyesters containing phosphorus, for example poly (diallyl phenylphosphonate) may be considered to have acceptable characteristics.

We claim:

1. An optical instrument including a lens system involving optical magnification and a laminated glass window, said glass window comprising at least two glass laminations, an adhesive of thermo-setting transparent optical epoxy resin cement and a curing agent located directly between said laminations, and heating means for the instrument, said heating means comprising thin wire electrically conductive elements located between said laminations and attached to terminal means for electrical energisation.

2. An optical instrument including a lens system involving optical magnification and a laminated glass window structure, said window structure including at least two sheets of glass, a series of thin wire electrically conductive elements located between said sheets, which elements may be electrically energised to heat said sheets, and an adhesive of transparent thermo-setting optical cement, said adhesive comprising a polyamine and an epoxide resin based on the condensation product of a polyfunctional halohydrin and a polyhydric phenol.

3. A laminated glass structure comprising at least two glass laminations, an adhesive of thermo-setting transparent optical cement located directly between said laminations, said adhesive comprising a polyamine and an epoxide resin based on the condensation product of a polyfunctional halohydrin and a polyhydric phenol.

4. An optical instrument including a lens system involving optical magnification and a laminated glass window, said window comprising at least two glass laminations, a series of thin wire electrically conductive elements located between said laminations, which elements may be electrically energised to heat said sheets, an adhesive of thermosetting transparent synthetic resin located between said laminations, said adhesive having a relatively small change in refractive index over the temperature range 20° C. to 400° C.

References Cited in the file of this patent
UNITED STATES PATENTS

| | | |
|---|---|---|
| 1,223,583 | Hitchcock | Apr. 24, 1917 |
| 1,758,703 | Johnson | May 13, 1930 |
| 2,785,085 | Sayre | Mar. 12, 1957 |
| 2,828,235 | Holland et al. | Mar. 25, 1958 |
| 2,853,589 | Crooke | Sept. 23, 1958 |